(12) United States Patent
Babin et al.

(10) Patent No.: US 7,753,676 B2
(45) Date of Patent: Jul. 13, 2010

(54) MULTI-PIECE VALVE PIN BUSHING

(75) Inventors: Denis Babin, Georgetown (CA);
Fabrice Fairy, Georgetown (CA);
Rhonda Goslinski, Guelph (CA)

(73) Assignee: Mold-Masters (2007) Limited, Georgetown (CA)

( * ) Notice: Subject to any disclaimer, the term of this patent is extended or adjusted under 35 U.S.C. 154(b) by 214 days.

(21) Appl. No.: 12/135,133

(22) Filed: Jun. 6, 2008

(65) Prior Publication Data
US 2009/0142440 A1    Jun. 4, 2009

Related U.S. Application Data

(60) Provisional application No. 60/942,929, filed on Jun. 8, 2007.

(51) Int. Cl.
*B29C 45/23* (2006.01)
(52) U.S. Cl. ............... 425/564; 264/328.9; 425/566
(58) Field of Classification Search ............... 425/562, 425/563, 564, 565, 566; 264/328.9
See application file for complete search history.

(56) References Cited

U.S. PATENT DOCUMENTS

| | | | | |
|---|---|---|---|---|
| 4,053,271 | A * | 10/1977 | Gellert | 425/562 |
| 5,067,893 | A * | 11/1991 | Osuna-Diaz | 425/564 |
| 5,094,603 | A | 3/1992 | Gellert | |
| 5,106,291 | A | 4/1992 | Gellert | |
| 5,192,556 | A | 3/1993 | Schmidt | |
| 5,254,305 | A | 10/1993 | Fernandez et al. | |
| 5,334,010 | A | 8/1994 | Teng | |
| 5,387,099 | A | 2/1995 | Gellert | |
| 5,820,803 | A * | 10/1998 | Hashimoto | 425/566 |
| 5,849,343 | A * | 12/1998 | Gellert et al. | 425/564 |
| 5,891,381 | A | 4/1999 | Bemis et al. | |
| 5,948,448 | A | 9/1999 | Schmidt | |
| 6,214,275 | B1 * | 4/2001 | Catoen et al. | 264/328.9 |
| 6,436,320 | B1 | 8/2002 | Kazmer et al. | |
| 6,524,093 | B2 | 2/2003 | Bouti | |
| 6,669,462 | B1 * | 12/2003 | Jenko | 425/564 |
| 6,679,697 | B2 | 1/2004 | Bouti | |
| 6,752,618 | B2 | 6/2004 | Dewar et al. | |
| 6,840,758 | B2 | 1/2005 | Babin et al. | |
| 7,172,409 | B2 | 2/2007 | Tabassi | |
| 7,214,048 | B2 * | 5/2007 | Kim | 425/566 |
| 2006/0097083 | A1 | 5/2006 | Hofstetter et al. | |
| 2006/0153945 | A1 | 7/2006 | Blais et al. | |
| 2007/0065537 | A1 | 3/2007 | Ciccone | |
| 2007/0119504 | A1 | 5/2007 | Yu | |

FOREIGN PATENT DOCUMENTS

| | | |
|---|---|---|
| CN | 2608257 | 3/2004 |
| DE | 33 36 258 C2 | 4/1985 |
| JP | 58-128827 A | 8/1983 |

(Continued)

*Primary Examiner*—Tim Heitbrink
(74) *Attorney, Agent, or Firm*—Medler Ferro PLLC

(57) ABSTRACT

A bushing body has an upstream portion and a downstream portion for extending into a channel. The bushing body has a bore therethrough for receiving a valve pin. A contoured sleeve is fit around the downstream portion of the bushing body for guiding a flow of molding material. A cap piece is coupled to the upstream portion of the bushing body for contacting a back plate.

20 Claims, 3 Drawing Sheets

FOREIGN PATENT DOCUMENTS

| | | |
|---|---|---|
| JP | 6-344388 A | 12/1994 |
| KR | 10-0296968 B1 | 5/2001 |
| KR | 10-2006-0032980 | 4/2006 |
| TW | 549224 | 8/2003 |
| WO | WO-2007-014954 A1 | 2/2007 |
| WO | WO-2007/098798 A1 | 9/2007 |
| WO | WO-2007/137648 A1 | 12/2007 |

* cited by examiner

MULTI-PIECE VALVE PIN BUSHING

CROSS-REFERENCE TO RELATED APPLICATION

This application claims the benefit of U.S. provisional patent application No. 60/942,929 filed Jun. 8, 2007, which is hereby incorporated by reference in its entirety herein.

BACKGROUND OF THE INVENTION

1. Field of the Invention

The present invention relates generally to an injection molding apparatus and, more particularly, to a valve pin bushing for a hot half of an injection molding apparatus.

2. Related Art

In an injection molding apparatus having a hot half with a hot runner, a movable valve pin can be used to control flow of molding material (e.g., plastic melt) through a nozzle. A portion of the valve pin extends into a melt channel to control the flow of molding material, and a portion of the valve pin extends outside the melt channel for connection to an actuating mechanism.

Typically, a valve pin bushing is installed in a manifold to guide the movement of the valve pin and seal against leakage of molding material out of the melt channel. Sealing generally requires strict tolerances.

Regarding sealing, a bore in the valve pin bushing, through which the pin moves, typically wears over time from the cycling of the valve pin, and, eventually, the gap between the valve pin and the bore grows to permit leakage of molding material therethrough. Leakage can be in the form of melt, melt residue, or gasses, any of which can damage the molding apparatus or pollute the environment. Leaking melt and melt residue can also seize the pin in the valve pin bushing, preventing the injection molding apparatus from operating properly. Once the leakage is excessive, the hot half must be disassembled and cleaned, and the valve pin bushing might have to be refurbished or replaced along with any other damaged equipment.

SUMMARY OF THE INVENTION

According to one aspect of the invention, a bushing body has an upstream portion and a downstream portion for extending into a channel. The bushing body has a bore therethrough for receiving a valve pin. A contoured sleeve is fit around the downstream portion of the bushing body for guiding a flow of molding material. A cap piece is coupled to the upstream portion of the bushing body for contacting a back plate.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
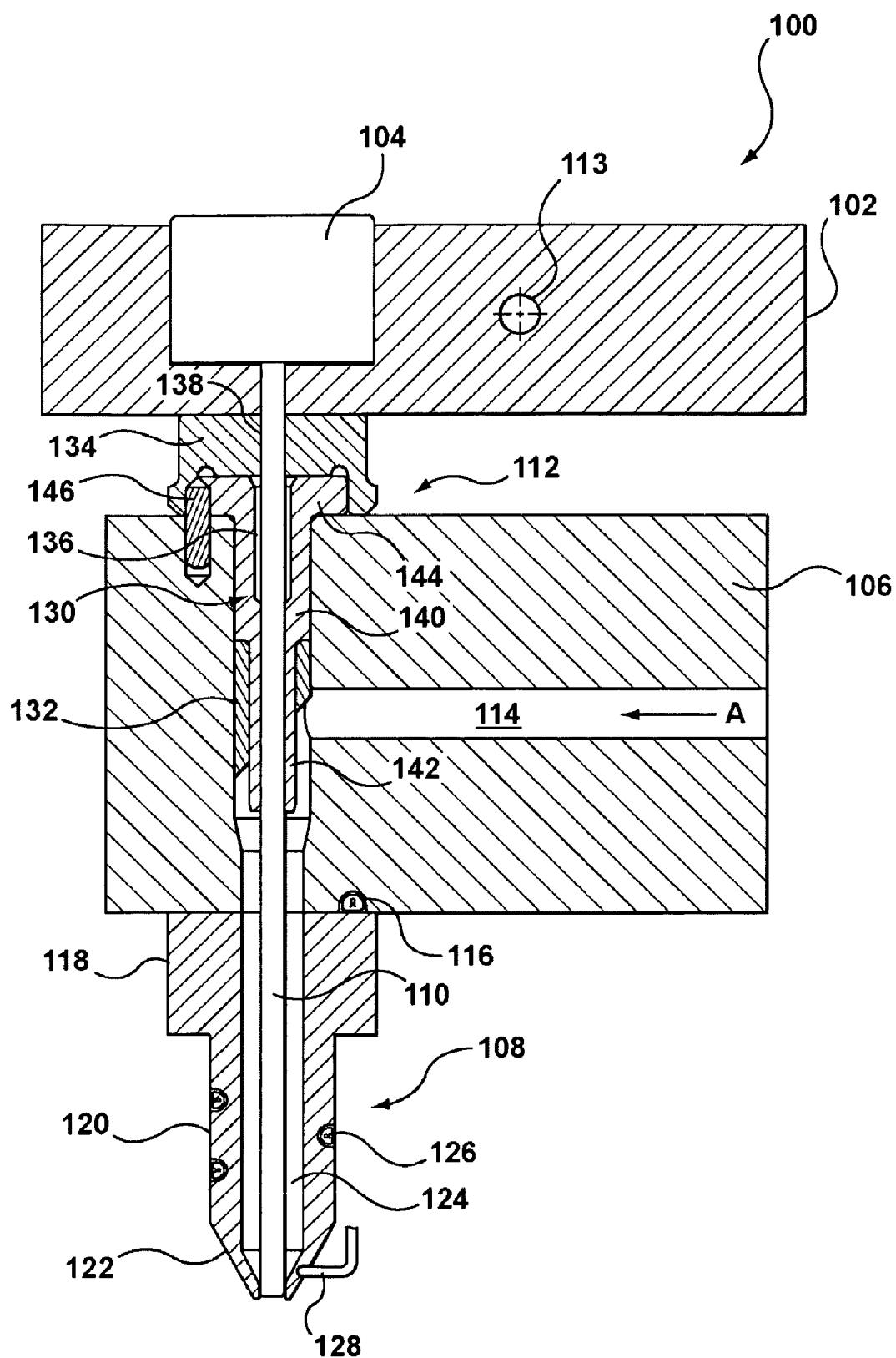
FIG. 1 is a sectional view of a hot half for an injection molding apparatus according to an embodiment of the present invention.

FIG. 1 shows a hot half 100 for an injection molding apparatus according to an embodiment of the present invention. The features and aspects described for the other embodiments can be used accordingly with the present embodiment.

The hot half 100 includes a back plate 102, an actuator 104, a manifold 106, a nozzle 108, a valve pin 110, and a valve pin bushing 112. The hot half 100 can include mold and cavity plates and other well-known components, such as bolts, alignment dowels, electrical connectors, mold gate inserts, and so on. In addition, while only one nozzle 108 is depicted for ease of explanation, the hot half 100 can have any number of nozzles.

The back plate 102 accommodates the actuator 104, which may be a hydraulic, pneumatic, electrical, or other type of actuator. The actuator 104 controls the position of the valve pin 110. The back plate 102 has a cooling channel 113 for circulating cooling fluid.

The manifold 106 includes a manifold channel 114 for flow of molding material (e.g., plastic melt) in a downstream direction as indicated by arrow A. The manifold channel 114 extends from a sprue (not shown) to the nozzle 108. The manifold 106 includes a manifold heater 116, which can be an electrical resistance heater wire, for example.

The nozzle 108 includes a nozzle head 118, a nozzle body 120, and a nozzle tip 122, which define a nozzle channel 124. The nozzle channel 124 communicates with the manifold channel 114 to deliver molding material from the manifold 106 to a mold cavity (not shown). The nozzle 108 further includes a nozzle heater 126, which can be an electrical resistance heater wire, for example, and a thermocouple 128. The nozzle 108 in combination with the manifold 106 can be called a hot runner. The nozzle 108 can be held to the manifold 106 by bolts (not shown) or other known means.

The valve pin 110 extends from the actuator 104, through the manifold 106 and nozzle 108, and to the mold cavity. The valve pin 110 controls flow of molding material into the mold cavity.

The valve pin bushing 112 includes a bushing body 130, a contoured sleeve 132, and a cap piece 134. The bushing body 130 has a bore 136 therethrough for receiving the valve pin 110. The cap piece 134 has a similar bore 138. The bushing body 130 has an upstream portion 140 and a downstream portion 142 that extends into the manifold channel 114. (In another embodiment, the downstream portion 142 could extend into the nozzle channel 124.) The downstream portion 142 is narrower than the upstream portion 140 and forms a seal with the valve pin 110 to inhibit leakage of molding material. The upstream portion 140 has a flange 144 for securing the bushing body 130 to the manifold 106 in conjunction with a dowel 146, which serves to orient the valve pin bushing 112 with respect to the manifold 106. The contoured sleeve 132 is fit around the downstream portion 142 and has a contoured surface (ref. 150 of FIG. 2) that guides the flow of molding material and reduces the amount of molding material that stagnates on the downstream side of the valve pin 110. The contoured surface can be curved or simply beveled. The cap piece 134 is coupled to the upstream portion 140 of the bushing body 130 and contacts the back plate 102.

Figure 2:
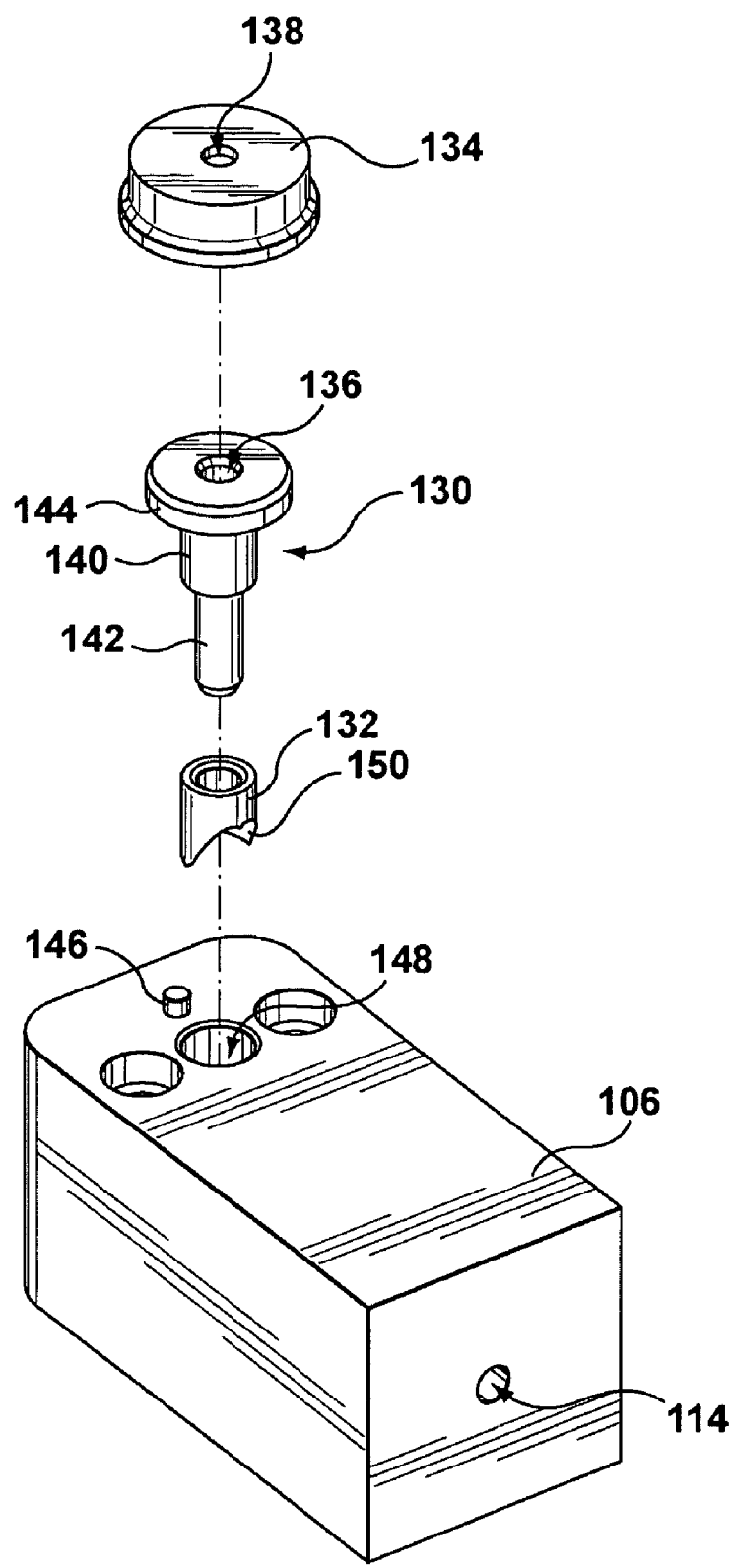
FIG. 2 is an exploded view of the valve pin bushing and manifold of FIG. 1.

FIG. 2 shows the cap piece 134, the bushing body 130, and the contoured sleeve 132 separated and removed from the manifold 106. In this view, a bore 148 in the manifold 106 for accommodating the valve pin bushing 112 can be seen. Also shown is the contoured surface 150 of the contoured sleeve 132.

The cap piece 134 and upstream portion 140 of the bushing body 130 may be loosely fit together, meaning that they can be separated by hand or with simple hand tools. The contoured sleeve 132 may be thermally attached (e.g., brazed, soldered, or welded) or mechanically attached (e.g., shrink fitted) to the downstream portion 142 of the bushing body 130. Other methods of attachment are also acceptable. The cap piece 134, the bushing body 130, and the contoured sleeve 132 are separately manufactured before being joined to form the valve pin bushing 112. This simplifies manufacture of the valve pin bushing 112.

Regarding materials, the cap piece 134, the bushing body 130, and the contoured sleeve 132 may be made of tool steel. The material of the cap piece 134 may also be selected to vary the thermal characteristics of the valve pin bushing 112. For example, if the bushing body 130 is too cool in operation, the material of the cap piece 134 can be selected to have a lower thermal conductivity than the material of the bushing body 130 to insulate the bushing body 130 from the relatively cool back plate 102. Such relatively insulative materials include ceramics and titanium, for example. Likewise, if the bushing body 130 is too hot in operation, the material of the cap piece 134 can be selected to have a higher thermal conductivity than the material of the bushing body 130 to more effectively conduct heat in the bushing body 130 to the relatively cool back plate 102. Such relatively conductive materials include alloys of steel, copper and its alloys, and aluminum and its alloys, for example.

In operation, the bushing body 130 guides the valve pin 110 and can align the valve pin 110 with a mold gate (not shown). If the wall thickness of the downstream portion 142 of the bushing body 130 is thin enough, the pressure of the molding material compresses the downstream portion 142 to enhance the sealing effect on the valve pin 110. The downstream portion 142 of the bushing body 130 protects the valve pin 110 from impingement of flowing molding material. The contoured sleeve 132 guides the flow of molding material and reduces the amount of stagnating molding material, that is, reduces the so-called valve pin shadow effect. As such, the contoured sleeve 132 is especially useful for color change. And, depending on the material selected for the cap piece 134, heat flow from the relatively hot manifold 106 to the relatively cool back plate 102 is affected to enhance the sealing of the bushing body 130 and/or cap piece 134 against the valve pin 110.

Figure 3:
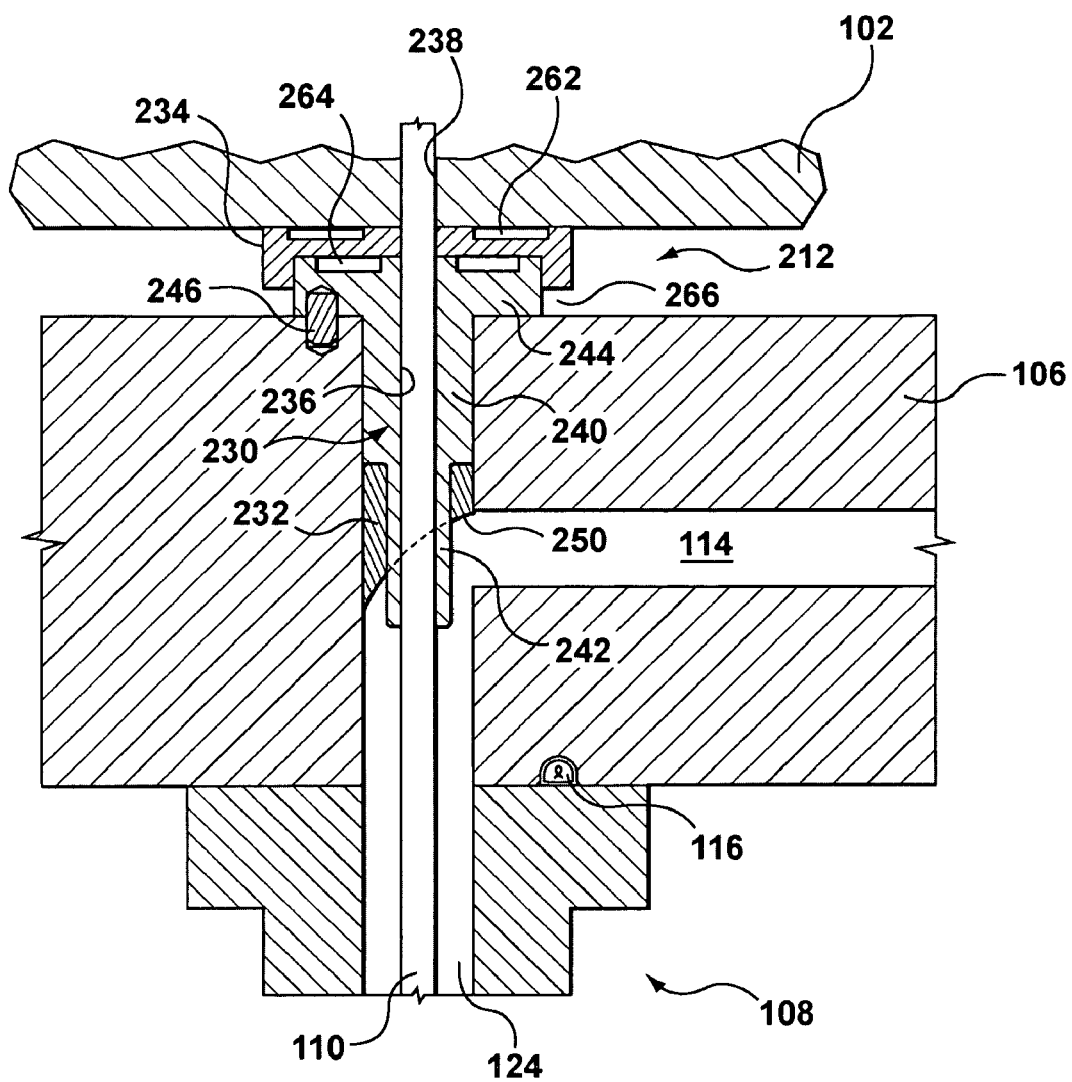
FIG. 3 is a sectional view of a valve pin bushing according to another embodiment of the present invention.

FIG. 3 shows a valve pin bushing 212 according to another embodiment of the present invention. The features and aspects described for the other embodiments can be used accordingly with the present embodiment.

The valve pin bushing 212 includes a bushing body 230, a contoured sleeve 232, and a cap piece 234. The bushing body 230 has a bore 236 therethrough for receiving the valve pin 110. The cap piece 234 has a similar bore 238. The bushing body 230 has an upstream portion 240 and a downstream portion 242 that extends into the manifold channel 114. (In another embodiment, the downstream portion 242 could extend into the nozzle channel 124.) The downstream portion 242 is narrower than the upstream portion 240. The bushing body 230 and/or the cap piece 234 forms a seal with the valve pin 110 to inhibit leakage of molding material. The upstream portion 240 of the bushing body 230 has a flange 244 for securing the bushing body 230 to the manifold 106 in conjunction with a dowel 246, which serves to orient the valve pin bushing 212 (and specifically the contoured sleeve 232) with respect to the manifold 106. The contoured sleeve 232 is fit around the downstream portion 242 and has a contoured surface 250 that guides the flow of molding material and reduces the amount of molding material that stagnates on the downstream side of the valve pin 110. In this embodiment, the contoured surface 250 is curved. The cap piece 234 is coupled to the upstream portion 240 of the bushing body 230 and contacts the back plate 102.

Between the cap piece 234 and the back plate 102 is a gap 262. In this embodiment, the gap 262 is defined by a recess in an upper surface of the cap piece 234, and in other embodiments a similar recess can be additionally or alternatively provided in the back plate 102. The gap 262 can have any shape (e.g., annular) and can contain air which acts to thermally insulate the cap piece 234 from the back plate 102. This can reduce the cooling effect of the back plate 102 on the valve pin bushing 212.

Between the bushing body 230 and the cap piece 234 is a gap 264. In this embodiment, the gap 264 is defined by a recess in an upper surface of the bushing body 230, and in other embodiments a similar recess can be additionally or alternatively provided in the cap piece 234. The gap 264 can have any shape (e.g., annular) and can contain air which acts to thermally insulate the bushing body 230 from the cap piece 234. This can reduce the cooling effect of the cap piece 234 on the bushing body 230 (or reduce the heating effect of the manifold 106 on the cap piece 234).

In this embodiment, the cap piece 234 does not contact the manifold 106. As such, an annular gap 266 exists between the cap piece 234 and the manifold 106. This can reduce the heating effect of the manifold 106 on the cap piece 234.

The materials, manufacturing techniques, and additional effects of the valve pin bushing 212 are as described in the other embodiments.

Although preferred embodiments of the present invention have been described, those of skill in the art will appreciate that variations and modifications may be made without departing from the spirit and scope thereof as defined by the appended claims. All patents and publications discussed herein are incorporated in their entirety by reference thereto.

What is claimed is:

1. A valve pin bushing for a hot runner, comprising:
a bushing body having a bore therethrough for receiving a valve pin, the bushing body having an upstream portion and a downstream portion for extending into a channel of molding material;
a contoured sleeve fit around the downstream portion of the bushing body and having a contoured surface for guiding flow of molding material in the channel, the downstream portion of the bushing body extending downstream from the contoured surface; and
a cap piece having a bore therethrough for receiving a valve pin, the cap piece coupled to the upstream portion of the bushing body for contacting a back plate.

2. The valve pin bushing of claim 1, wherein the cap piece is of a material having a lower thermal conductivity than the material of the bushing body.

3. The valve pin bushing of claim 1, wherein the cap piece is of a material having a higher thermal conductivity than the material of the bushing body.

4. The valve pin bushing of claim 1, wherein the contoured sleeve is mechanically attached to the downstream portion of the bushing body.

5. The valve pin bushing of claim 4, wherein the contoured sleeve is shrink fitted to the downstream portion of the bushing body.

6. The valve pin bushing of claim 1, wherein the contoured sleeve is thermally attached to the downstream portion of the bushing body.

7. The valve pin bushing of claim 6, wherein the contoured sleeve is brazed, soldered, or welded to the downstream portion of the bushing body.

8. The valve pin bushing of claim 1, wherein the upstream portion of the bushing body has a flange for securing the bushing body to a manifold in conjunction with a dowel to orient the valve pin bushing with respect to the manifold.

9. The valve pin bushing of claim 1, wherein the downstream portion of the bushing body extending downstream from the contoured surface has a wall thickness that compresses under pressure of the molding material.

10. The valve pin bushing of claim 1, wherein the contoured surface of the contoured sleeve is curved or beveled.

11. The valve pin bushing of claim 1, wherein the bushing body or cap piece has a recess that defines a gap between the bushing body and the cap piece.

12. The valve pin bushing of claim 1, wherein a gap exists between the cap piece and a manifold.

13. The valve pin bushing of claim 1, wherein the cap piece has a recess that defines a gap between the cap piece and the back plate.

14. An injection molding apparatus comprising
a back plate;
an actuator coupled to the back plate;
a valve pin extending from the actuator, the actuator for controlling the position of the valve pin;
a manifold having a manifold channel;
a nozzle coupled to the manifold, the nozzle having a nozzle channel in communication with the manifold channel; and
a valve pin bushing inserted into a bore of the manifold and contacting the back plate, the valve pin bushing comprising,
a bushing body having a bore therethrough for receiving the valve pin, the bushing body having an upstream portion and a downstream portion for extending into a channel of molding material;
a contoured sleeve fit around the downstream portion of the bushing body and having a contoured surface for guiding flow of molding material in the channel, the downstream portion of the bushing body extending downstream from the contoured surface; and
a cap piece having a bore therethrough for receiving the valve pin, the cap piece coupled to the upstream portion of the bushing body and contacting the back plate.

15. The injection molding apparatus of claim 14, wherein the cap piece has a thermal conductivity different from that of the bushing body.

16. The injection molding apparatus of claim 14, wherein the contoured sleeve is mechanically attached to the downstream portion of the bushing body.

17. The injection molding apparatus of claim 14, wherein the contoured sleeve is thermally attached to the downstream portion of the bushing body.

18. The injection molding apparatus of claim 14, wherein the bushing body or cap piece has a recess that defines a gap between the bushing body and the cap piece.

19. The injection molding apparatus of claim 14, wherein a gap exists between the cap piece and a manifold.

20. The injection molding apparatus of claim 14, wherein the cap piece or the back plate has a recess that defines a gap between the cap piece and the back plate.

* * * * *